(12) United States Patent
Gold

(10) Patent No.: US 9,080,848 B1
(45) Date of Patent: Jul. 14, 2015

(54) MEASURING FISHING NET AND METHOD OF USE THEREOF

(71) Applicant: Peter Gold, Rockville Centre, NY (US)

(72) Inventor: Peter Gold, Rockville Centre, NY (US)

( * ) Notice: Subject to any disclaimer, the term of this patent is extended or adjusted under 35 U.S.C. 154(b) by 0 days.

(21) Appl. No.: 14/602,826

(22) Filed: Jan. 22, 2015

(51) Int. Cl.
*G01B 5/02* (2006.01)
*A01K 77/00* (2006.01)

(52) U.S. Cl.
CPC .. *G01B 5/02* (2013.01); *A01K 77/00* (2013.01)

(58) Field of Classification Search
CPC ..... A01K 77/00; A01K 75/00; A01K 61/001; A01K 61/007; A01K 73/045; A01K 74/00; A01K 75/04; A01K 97/08
USPC .......................................................... 33/511
See application file for complete search history.

(56) References Cited

U.S. PATENT DOCUMENTS

| | | | |
|---|---|---|---|
| 1,474,804 A | 11/1923 | Tyrrell | |
| 1,657,892 A | 1/1928 | Muldoon | |
| 2,482,718 A | 9/1949 | Oathout | |
| 2,600,773 A | 6/1952 | Hungerford | |
| 2,633,351 A * | 3/1953 | Fowle | 177/131 |
| 3,004,362 A | 10/1961 | Day | |
| 3,223,189 A * | 12/1965 | Robbins | 177/149 |
| 3,259,988 A | 7/1966 | Lunn | |
| 3,638,346 A | 2/1972 | Stein | |
| 3,782,020 A | 1/1974 | Puckett | |
| 4,631,851 A | 12/1986 | Whitehurst | |
| 4,870,773 A | 10/1989 | Schmucker et al. | |
| 4,876,818 A * | 10/1989 | Fralick et al. | 43/7 |
| D319,681 S * | 9/1991 | Mengo | D22/135 |
| 5,097,617 A | 3/1992 | Craven | |
| 5,148,607 A | 9/1992 | Lasiter | |
| 5,228,226 A | 7/1993 | Porosky | |
| 6,032,399 A * | 3/2000 | DePoe | 43/12 |
| 6,094,996 A * | 8/2000 | Campbell et al. | 73/862.474 |
| 6,615,532 B2 * | 9/2003 | Abel | 43/7 |
| 7,624,529 B2 | 12/2009 | Abel | |
| 7,665,220 B1 * | 2/2010 | Gee | 33/511 |
| 8,431,838 B2 * | 4/2013 | Bond et al. | 177/131 |
| 2003/0106255 A1 * | 6/2003 | Abel | 43/7 |
| 2004/0040196 A1 * | 3/2004 | Schwartz | 43/11 |
| 2004/0144014 A1 * | 7/2004 | Abel | 43/11 |
| 2009/0100739 A1 * | 4/2009 | Resch et al. | 43/12 |
| 2011/0220426 A1 * | 9/2011 | Bond et al. | 177/245 |

* cited by examiner

*Primary Examiner* — Yaritza Guadalupe-McCall
(74) *Attorney, Agent, or Firm* — Galgano & Associates, PLLC; Thomas M. Galgano; Jessica G. Bower

(57) ABSTRACT

A measuring fishing net for holding and measuring a size of a fish and a method of use of the net, including a frame having a handle and a substantially enclosed loop. The frame further having an axis extending in a direction parallel to the frame and a net attached to the loop of the frame, for holding the fish. A measuring scale runs linearly along the axis and length markings are disposed on the loop of the frame, to measure the size of the fish by comparing the fish to the length markings.

21 Claims, 3 Drawing Sheets

MEASURING FISHING NET AND METHOD OF USE THEREOF

BACKGROUND OF THE INVENTION

1. Field of the Invention

The present invention is generally in the field of fishing equipment. More particularly, the present invention is a fishing net for both holding a fish and for measuring the length or width of the fish via a measuring scale marked on the frame of the fishing net.

2. Brief Description of the Prior Art

Fishing is a popular activity both as a means to gather food but also as a sport. Often times, a fisherman uses a handheld fishing net to scoop a fish out of the water, once caught. This is especially true in catch-and-release sportfishing. However, typically there are size, and particularly, length and/or width requirements that a fish must meet before a fisherman can keep the fish. Otherwise, if the fish does not meet certain length or other size restrictions, the fisherman must return the fish to the water.

Therefore, there is a need to measure the size, and, particularly, the length or width of a fish both quickly and easily and without harming the fish. It is also desirable to provide a measuring scale which is incorporated into the fishing equipment, such as a fishing net, to eliminate the need for a separate measuring device, such as a ruler or measuring tape. There is also a need to be able to measure the size of a fish while it is located in the water or out of the water.

While the prior art discloses many types of fishing nets, so far as is known, none of these apparatus or methods of use thereof, resolve these problems in a simple, effective, and yet highly advantageous manner, as in the present invention.

SUMMARY OF THE INVENTION

It is therefore an object of the present invention to provide a novel fishing net and method of use thereof which provides a measuring scale marked on the frame of a fishing net, for measuring the size of a fish.

It is also an object of the present invention to provide a fishing net and method of use thereof, which can be utilized to measure the size of a fish within the net either while the fishing net and fish are disposed below the surface of the water, when the fishing net is partially within the water and partially above the surface of the water, and when the fishing net and fish are completely out of the water and/or located on a surface out of the water.

It is also an object of the present invention to provide a fishing net and method of use thereof which allows the size, and particularly, the length and width of the fish to be determined quickly and accurately.

It is yet another object of the present invention to provide a fishing net and method of use thereof in which the fishing net can be controlled by a handle to capture and control a fish within the net, without having to handle or touch the fish for measuring purposes, in order to determine whether to capture or release the fish and/or to provide means to steady the fish to allow a picture to be taken, recording the size of the fish with the size validated as a result of the measuring scale on the fishing net.

Further, it is yet another object of the present invention to provide a fishing net and a method of use thereof which provides a measuring scale to mark a surface with corresponding measurements, in order to overlay objects to determine size measurements, as well as to measure the depth of water and tidal change movement measurement comparisons.

Certain of the foregoing and related objects are readily attained according to the present invention by the provision of a fishing net for holding and measuring a size of a fish, comprising a frame comprising a handle connected to a substantially enclosed loop, said frame having a first axis extending in a direction parallel thereto; a net attached to said loop of said frame, for holding the fish; and a measuring scale running linearly along said first axis, wherein said measuring scale comprises a plurality of length markings disposed on said loop of said frame, to measure the size of the fish by comparing the fish to said length markings. Preferably, said first axis extends in a direction parallel with said handle. In the preferred embodiment, said net comprises a pocket for holding the fish therein.

It is also advantageous that said length markings represent standard units of length and further comprise numerical designations associated with said length markings. Desirably, said standard units of length are selected from the group consisting of English units, metric units, and a combination of English units and metric units. In the preferred embodiment, said loop is generally oval shaped. Advantageously, said loop has opposite sides and said length markings are disposed on both of said sides of said loop.

In another preferred embodiment, the net further comprises a second axis extending in a direction parallel to said frame and a second measuring scale running linearly along said second axis, wherein said second measuring scale comprises a plurality of length markings disposed on said loop of said frame, to measure the size of the fish by comparing the fish to said length markings. Advantageously, said length markings begin generally adjacent said handle. It is desirable that said length markings are spaced apart along the entire length of said loop.

Certain of the foregoing and related objects are readily attained according to the present invention by the provision of a method for measuring a size of a fish, comprising the steps of providing a fishing net for holding and measuring the size of the fish, comprising a frame comprising a handle connected to a substantially enclosed loop, said frame having a first axis extending in a direction parallel thereto; a net attached to said loop of said frame, for holding the fish; and a measuring scale running linearly along said first axis, wherein said measuring scale comprises a plurality of length markings disposed on said loop of said frame, to measure the size of the fish by comparing the fish to said length markings; and comparing the fish to said length markings on said loop to measure the size of the fish.

Preferably, the method further comprises the step of aligning the fish with said first axis in a position which is generally adjacent said loop. Advantageously, said first axis extends in a direction parallel with said handle. Desirably, said net comprises a pocket for holding the fish therein.

In the preferred embodiment, said length markings represent standard units of length and further comprise numerical designations associated with said length markings. Advantageously, said standard units of length are selected from the group consisting of English units, metric units, and a combination of English units and metric units. In the preferred embodiment, said loop is generally oval shaped. Desirably, said loop has opposite sides and said length markings are disposed on both of said sides of said loop.

It is also preferred that said length markings begin generally adjacent said handle. It is desirable that said length markings are spaced apart along the entire length of said loop. Preferably, the method further comprises the step of providing a second axis extending in a direction parallel to said frame and a second measuring scale running linearly along said second axis, wherein said second measuring scale comprises a plurality of length markings disposed on said loop of said frame, to measure the size of the fish by comparing the fish to said length markings.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 1:
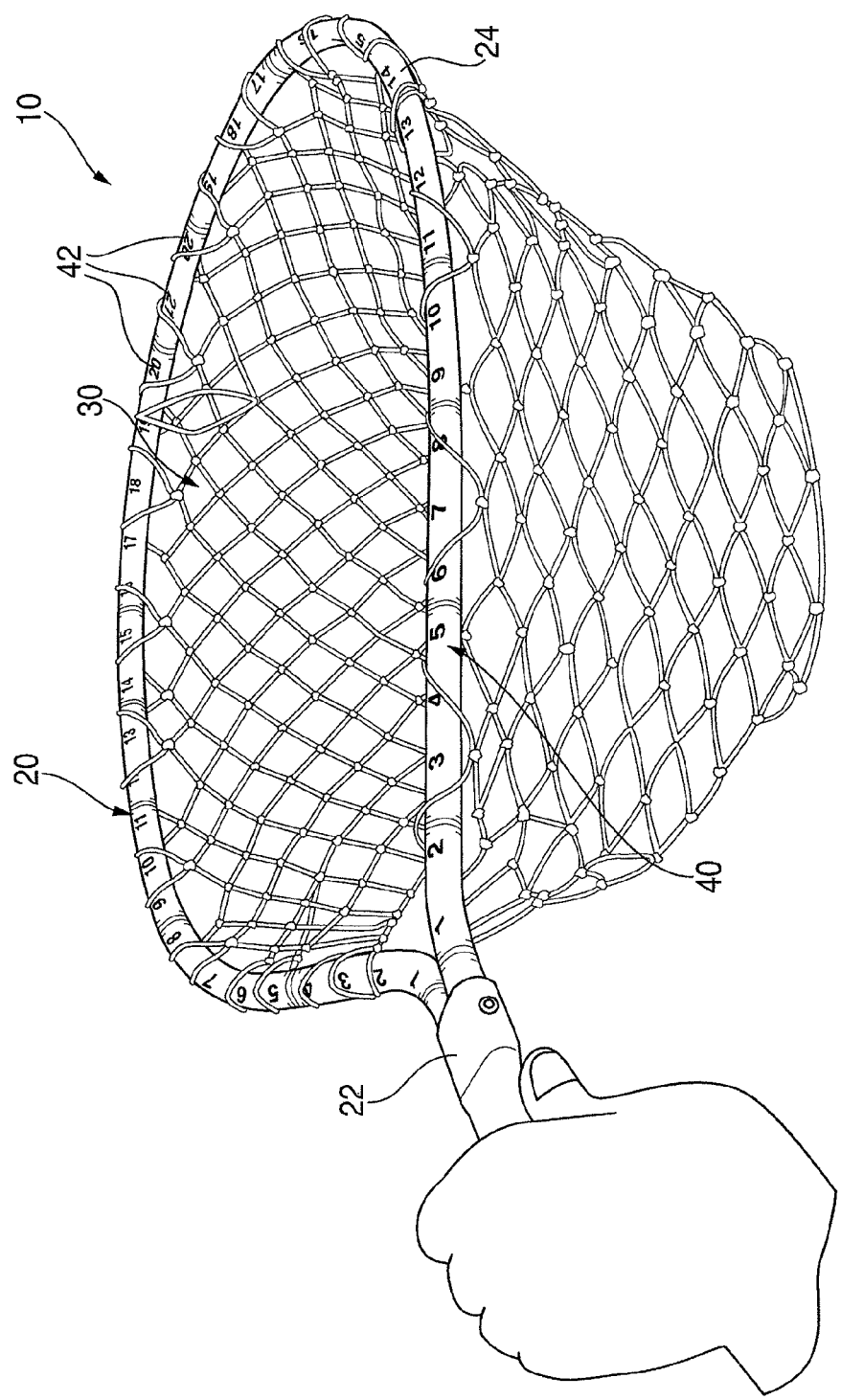
FIG. 1 is a perspective view of the fishing net for measuring a fish according to the present invention.
Figure 2:
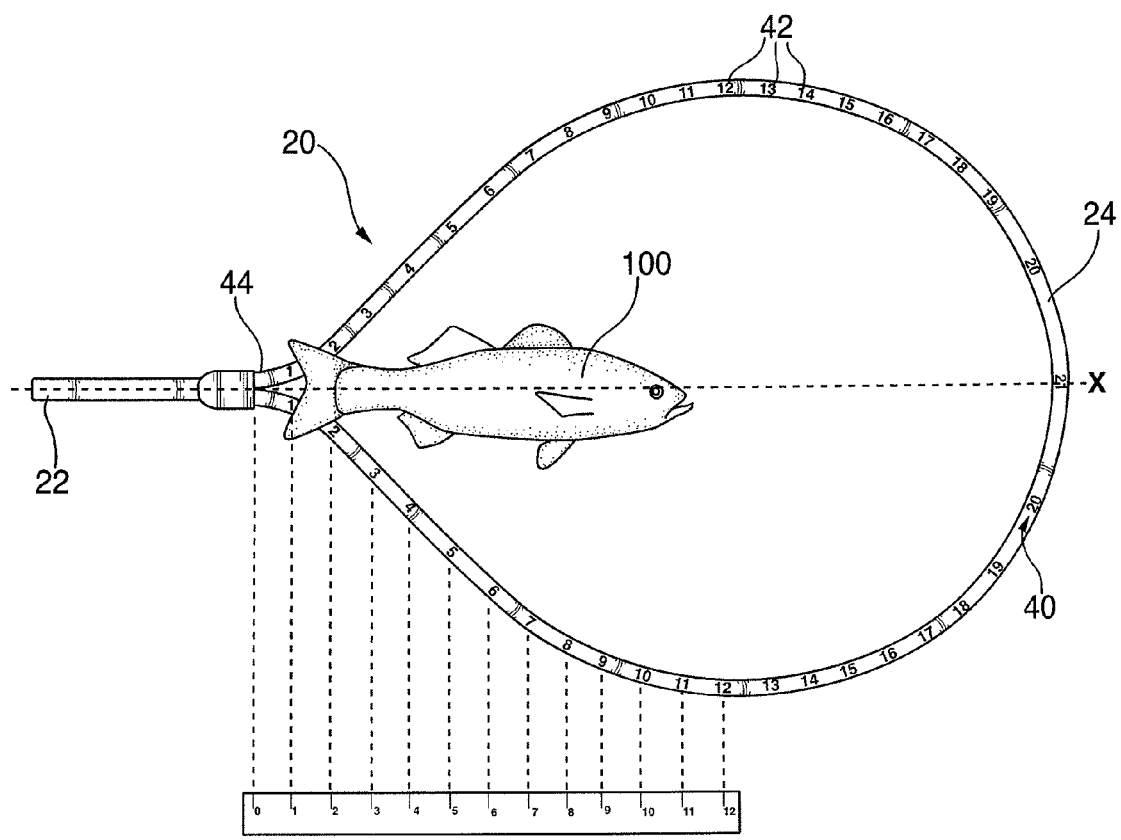
FIG. 2 is a top plan view of the frame of a first embodiment of the fishing net, illustrating a measuring scale marked on the frame.
Figure 3:
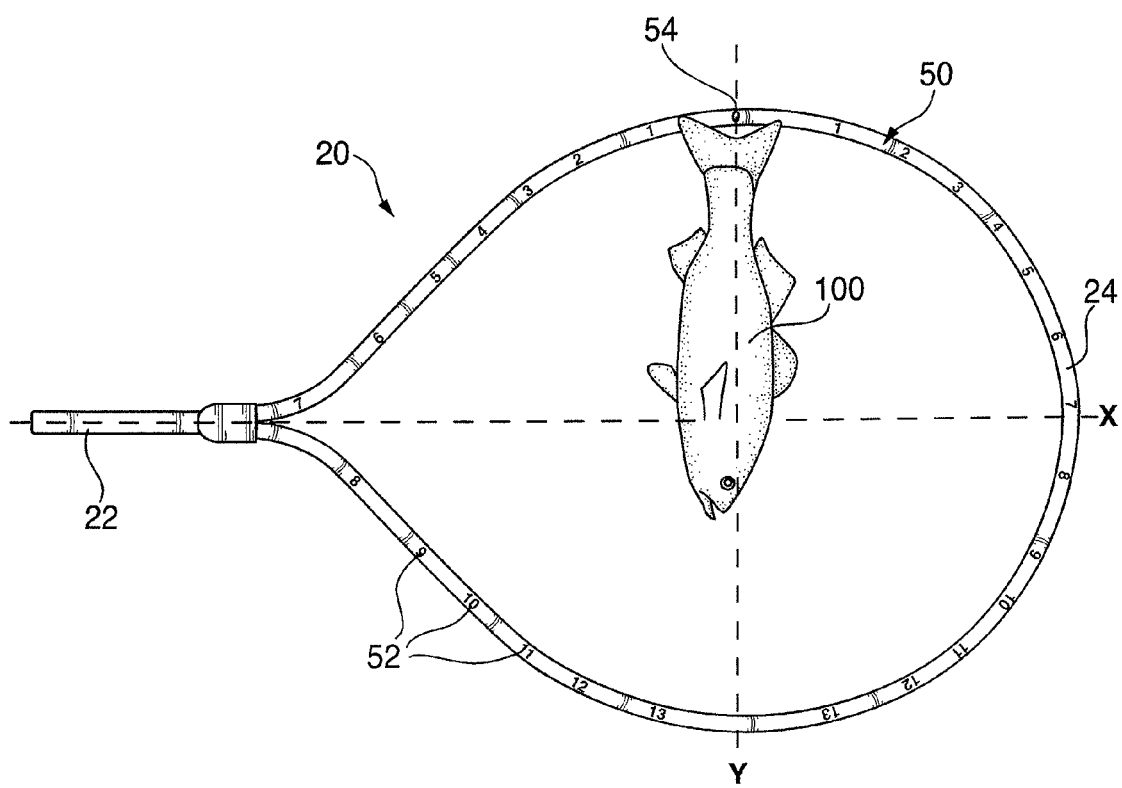
FIG. 3 is a top plan view of the frame of a second embodiment of the fishing net, illustrating a measuring scale marked on the frame.

Turning now in detail to the figures and particularly FIG. 1, which illustrates the fishing net according to the present invention, generally designated by reference numeral 10. Fishing net 10 is utilized to scoop a fish out of the water and hold the captured fish therein. In addition, as shown in FIGS. 2 and 3, fishing net 10 is utilized to allow a user to visually measure the size, and particularly, the length and/or width of a fish 100, or any other linear dimension of the fish 100, by comparing the fish 100 thereto. Fishing net 10 can be utilized to measure the size of a fish disposed within the net either while fishing net 10 and fish 100 are submerged below the surface of the water, or while fishing net 10 is partially submerged in the water and partially located above the surface of the water, while fishing net 10 and fish 100 are completely out of the water and/or on a surface out of the water.

In particular, as shown best in FIG. 1, fishing net 10 includes a frame 20 having an enclosed loop portion 24. Preferably, as seen in FIG. 1, frame 20 is handheld and includes a handle 22 connected to loop portion 24, for a user to grasp onto to hold the fishing net 10. Handle 22 allows the user to control and capture a fish 100 within fishing net 10, without having to handle or touch the fish. In a preferred embodiment shown in FIGS. 2 and 3, loop portion 24 of frame 20 is generally oval shaped defining an opening in the center thereof. In the preferred embodiment, loop portion 24 and handle 22 are formed by a generally cylindrical and hollow tube which has been bent into its shape shown in FIG. 1. However, any other suitable shapes can be utilized and would be well known to those having ordinary skill in the art. It is also preferable that frame 20 is made of a metal material, such as aluminum. However, any number of other suitable materials can be utilized, such as, for example, plastic or wood. Furthermore, handle 22 may be covered with a handgrip of rubber, a rubber-like material, or other material, to aid the user in grasping and holding fishing net 10.

As also shown in FIG. 1, loop portion 24 supports a net 30 which is connected thereto and extends downwardly therefrom. Net 30 is utilized to hold the fish 100 therein (not shown). Particularly, net 30 defines a pocket for holding the fish 100. Preferably, net 30 is made from a plurality of fibers woven together in a grid-like structure and the fibers can be manufactured from a variety of materials. Alternatively, net 30 may be constructed from other materials, such as, for example, a mesh material. The size of net 30 and the grid-like structure can vary depending on the application and the size of the fish intended to be held therein. While preferred embodiments of frame 20 and net 30 have been described and illustrated, it can be appreciated that their structures can vary and frame 20 and net 30 can assume different configurations. Such alternative configurations would be well known to those having ordinary skill in the art.

In addition, as seen in FIG. 2, frame 20 has a first axis x extending in a direction parallel thereto. Preferably, axis x extends in a direction parallel with handle 22. As seen in FIGS. 1 and 2, a measuring scale 40 runs linearly along axis x. As shown in FIG. 2, measuring scale 40 includes a plurality of length markings 42 disposed on loop portion 24 of frame 20, which are utilized by a user to measure the size of the fish 100 by visually comparing the fish 100 to length markings 42. While the measuring scale 40 has been identified as having length markings 42, such markings can be used to determine any desired linear dimension of the fish, such as its width or height. As shown in FIG. 2, loop portion 24 has opposite sides and, in a preferred embodiment, length markings 42 are disposed on both sides of loop 24. However, length markings 42 can be disposed on only one side of loop 24 or portions of either or both sides of loop 24.

Preferably, as seen in FIG. 2, length markings 42 begin generally adjacent handle 22 and the measuring scale 40 runs linearly therefrom, along axis x. In the preferred embodiment, the zero point 44 of measuring scale 40 is disposed generally adjacent the junction between handle 22 and loop 24. However, alternatively, the zero point may be disposed centrally on loop 24 and scale 40 may extend outwardly from both sides thereof, or be marked at any location on loop 24. It is also preferred that length markings 42 are spaced apart along the entire length of loop portion 24. However, length markings 42 can be disposed on only a portion of loop 24 and the orientation and alignment can vary.

In the preferred embodiment, length markings 42 represent standard units of length. For example, length markings 42 may include English units, such as inches, feet, etc. Alternatively, length markings 42 may include metric units, such as centimeter and millimeters. Length markings 42 may also include fractions of a unit such as, for example, ½ inch, ¼ inch, and ⅛ inch. In yet another embodiment, length markings 42 may include a combination of English units and metric units, such as, for example, English units on one side of loop portion 24 and metric units on the other side of loop 24. However, it can be appreciated that any size designations or standard measurement units may be utilized and their placement on loop 24 can vary. Furthermore, length markings 42 also include numerical designations associated therewith, such as, 1 inch, 2 inches, etc., to allow the user to determine the length of the fish 100.

Preferably, the length markings 42 are printed or marked onto the upper surface of the loop 24 of frame 20. However, other means to mark the length markings 42 onto frame 20 may be utilized such as, scoring and such means would be well known to those having ordinary skill in the art.

In an alternative embodiment of the invention shown in FIG. 3, fishing net 10 includes a second axis y extending in a direction parallel to frame 20. In a preferred embodiment shown in FIG. 3, axis y is disposed perpendicular to axis x at a 90 degree angle. However, other angles and orientations between axes x and y are possible. As seen in FIG. 3, a second measuring scale 50 runs linearly along second axis y and includes a second set of a plurality of length markings 52 disposed on loop 24 of frame 20, to measure the size of the fish 100 by comparing the fish to the second set of length markings 52. Furthermore, like length markings 42, the second set of length markings 52 can be marked on any portion of loop 24, in alignment with axis y. As shown in FIG. 3, the zero point 54 of measuring scale 50 is centrally on loop 24 in alignment with axis y.

Similar to the first set of length markings 42, the second set of length markings 52 represent standard units of length, such as English units, metric units, or a combination of English units and metric units. However, it can be appreciated that any size designations or standard measurement units may be utilized. Furthermore, the second set of length markings 52 may be a combination of various standard measurement units or other size designations. The second set of length markings 52 also have numerical designations associated therewith. Like length markings 42, length markings 52 are printed or marked on the upper surface of loop 24. However, other means to mark length markings 52 on frame 20 may be utilized. It can also be appreciated that frame 20 can be marked with both measuring scale 40 and second measuring scale 50.

In use, as shown in FIGS. 2 and 3, fishing net 10 is constructed in a manner which allows a user to quickly and easily visually measure the size of a fish 100. By the user grasping handle 22, fishing net 10 can be utilized to capture and control a fish within net 30, without having to handle or touch the fish for measuring purposes, in order to determine whether to capture or release the fish and/or to provide means to steady the fish to allow a picture to be taken, recording the size of the fish with the size validated as a result of the measuring scale on the fishing net 10. Particularly, after a fish 100 has been caught and held within net 30, the fish 100 is aligned with measuring scale 40 and/or 50 in axis x (FIG. 2) and axis y (FIG. 3), respectively, in a position which is generally adjacent and parallel to loop 24. The fish 100 is then compared to length markings 42 and/or 52 as shown in FIGS. 2 and 3, respectively, to measure the size of the fish 100, quickly and easily.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention. Particularly, while it has been described that the fishing net 10 according to the present invention can be utilized to measure the size of a fish, it can be appreciated that the net can be utilized to measure other marine life or even other animals. The net can be utilized to measure any desired object. For example, it can be utilized to over lay objects to determine their size measurements or utilized to mark a surface with corresponding measurements. It can also be utilized to measure the depth of the water or other tidal change movement comparisons.

What is claimed is:

1. A fishing net for holding and measuring a size of a fish, comprising:
   a frame comprising a handle connected to a substantially enclosed loop having an upper surface, said frame having a first axis extending in a direction parallel thereto;
   a net attached to said loop of said frame, for holding the fish; and
   a measuring scale running linearly along said first axis, wherein said measuring scale comprises a plurality of spaced-apart length markings marked along said upper surface of said loop of said frame, to measure the size of the fish by comparing the fish to said length markings disposed on said upper surface of said loop.

2. The fishing net according to claim 1, wherein:
   said first axis extends in a direction parallel with said handle.

3. The fishing net according to claim 1, wherein:
   said net comprises a pocket for holding the fish therein.

4. The fishing net according to claim 1, wherein:
   said length markings represent standard units of length and further comprise numerical designations associated with said length markings.

5. The fishing net according to claim 4, wherein:
   said standard units of length are selected from the group consisting of English units, metric units, and a combination of English units and metric units.

6. The fishing net according to claim 1, wherein:
   said loop is generally oval shaped.

7. The fishing net according to claim 1, wherein:
   said loop has opposite sides and said length markings are disposed on both of said sides of said loop.

8. The fishing net according to claim 1, further comprising:
   a second axis extending in a direction parallel to said frame and a second measuring scale running linearly along said second axis, wherein said second measuring scale comprises a plurality of length markings disposed on said loop of said frame, to measure the size of the fish by comparing the fish to said length markings.

9. The fishing net according to claim 1, wherein:
   said length markings begin generally adjacent said handle.

10. The fishing net according to claim 1, wherein:
    said length markings are spaced apart along the entire length of said loop.

11. A method for measuring a size of a fish, comprising the steps of:
    providing a fishing net for holding and measuring the size of the fish, comprising a frame comprising a handle connected to a substantially enclosed loop having an upper surface, said frame having a first axis extending in a direction parallel thereto; a net attached to said loop of said frame, for holding the fish; and a measuring scale running linearly along said first axis, wherein said measuring scale comprises a plurality of spaced-apart length markings marked along said upper surface of said loop of said frame, to measure the size of the fish by comparing the fish to said length markings; and
    comparing the fish to said length markings disposed on said upper surface of said loop to measure the size of the fish.

12. The method according to claim 11, further comprising the step of:
    aligning the fish with said first axis in a position which is generally adjacent said loop.

13. The method according to claim 11, wherein:
    said first axis extends in a direction parallel with said handle.

14. The method according to claim 11, wherein:
    said net comprises a pocket for holding the fish therein.

15. The method according to claim 11, wherein:
    said length markings represent standard units of length and further comprise numerical designations associated with said length markings.

16. The method according to claim 15, wherein:
    said standard units of length are selected from the group consisting of English units, metric units, and a combination of English units and metric units.

17. The method according to claim 11, wherein:
    said loop is generally oval shaped.

18. The method according to claim 11, wherein:
said loop has opposite sides and said length markings are disposed on both of said sides of said loop.

19. The method according to claim 11, wherein:
said length markings begin generally adjacent said handle.

20. The method according to claim 11, wherein:
said length markings are spaced apart along the entire length of said loop.

21. The method according to claim 11, further comprising:
providing a second axis extending in a direction parallel to said frame and a second measuring scale running linearly along said second axis, wherein said second measuring scale comprises a plurality of length markings disposed on said loop of said frame, to measure the size of the fish by comparing the fish to said length markings.

* * * * *